United States Patent [19]

Huther

[11] 4,037,989

[45] July 26, 1977

[54] VERTICAL AXIS WIND TURBINE ROTOR

[76] Inventor: Jerome W. Huther, R.R. No. 2, P.O. Box 36, Elkhart, Iowa 50073

[21] Appl. No.: 576,338

[22] Filed: May 12, 1975

[51] Int. Cl.² .................................................. F03D 3/06
[52] U.S. Cl. ................................ 416/197 A; 416/243
[58] Field of Search ............... 416/197, 197 A, 119, 416/243

[56] References Cited

U.S. PATENT DOCUMENTS

| 108,593 | 10/1870 | Hegworth | 416/197 X |
| 471,817 | 3/1892 | Green | 416/197 |
| 619,954 | 2/1899 | Goodrich | 416/163 |
| 692,714 | 2/1902 | Sala et al. | 416/197 X |
| 727,762 | 5/1903 | Edgar | 416/197 X |
| 752,764 | 2/1904 | Dunne | 416/197 A X |
| 925,063 | 6/1909 | White | 416/117 |
| 1,342,318 | 6/1920 | Yanacopoulos | 416/197 |
| 1,609,883 | 12/1926 | Potts | 416/197 X |
| 2,023,659 | 12/1935 | Amico | 416/197 |
| 2,224,851 | 12/1940 | Lea | 416/197 X |
| 3,930,750 | 1/1976 | Schultz | 416/197 A |

FOREIGN PATENT DOCUMENTS

| 913,964 | 9/1946 | France | 416/197 |
| 916,370 | 12/1946 | France | 416/197 |
| 19,401 | 12/1891 | United Kingdom | 416/197 |

Primary Examiner—Everette A. Powell, Jr.
Attorney, Agent, or Firm—Zarley, McKee, Thomte & Voorhees

[57] ABSTRACT

A vertical axis wind turbine which comprises in combination a stationary frame member, a rotatable shaft vertically journaled in the stationary frame member, a wind rotor positioned on the rotatable shaft with the wind rotor comprising a rotatable frame which has at least a pair of oppositely disposed arms radiating outwardly from the rotatable shaft with one arm having mounted thereon a concave surfaced wind catching member and the oppositely disposed arm having mounted thereon a convex surfaced wind deflecting member.

3 Claims, 4 Drawing Figures

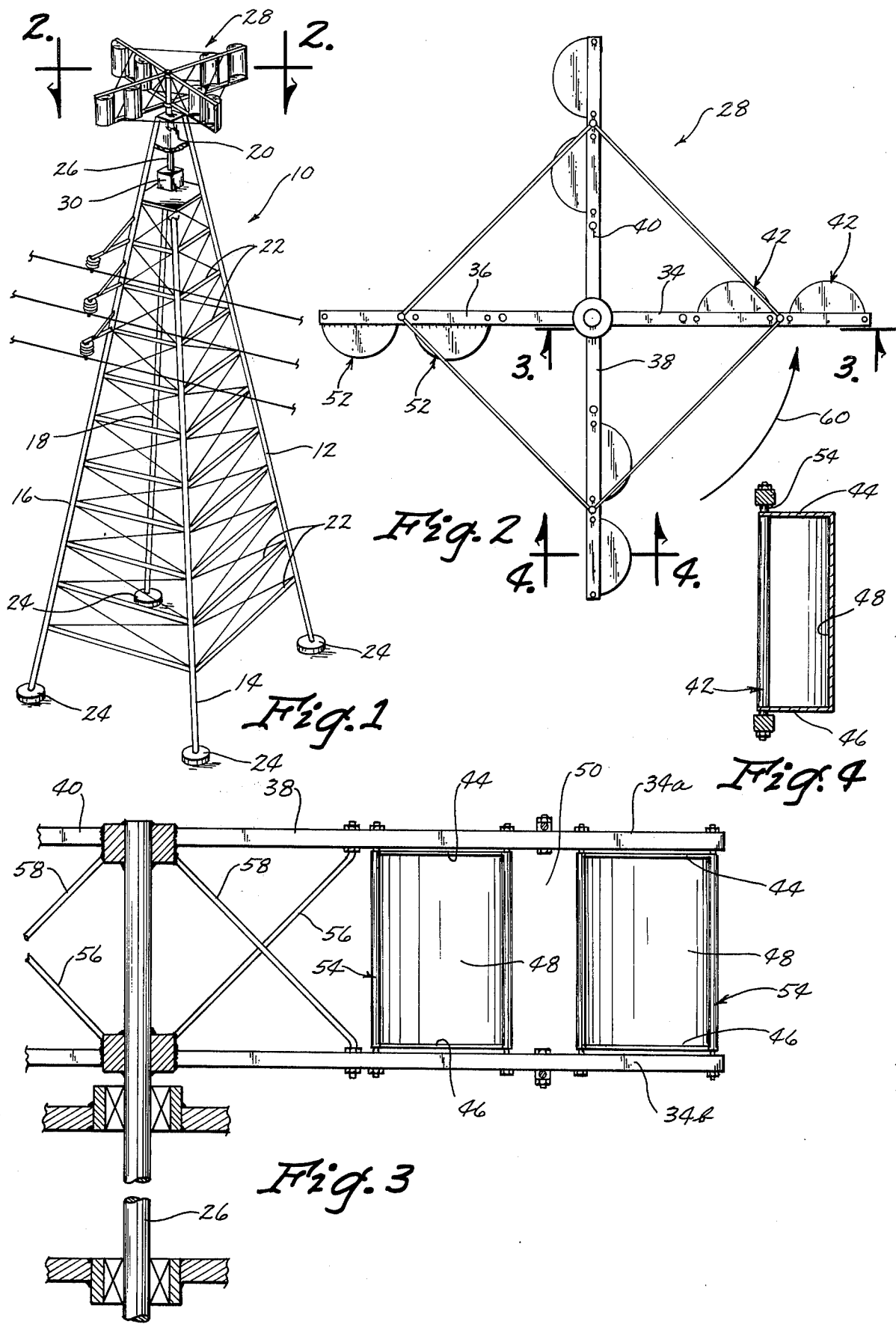

4,037,989

VERTICAL AXIS WIND TURBINE ROTOR

BACKGROUND OF THE INVENTION

Man has used wind energy for a long time, perhaps as long as 2000 years. However, with more modern times and rapidly developing technologies, the use of wind energy as a convenient and usable form of energy has been largely ignored. Thus during the rapid industrialization of the late 18th and 19centuries other forms of energy to supply power for industry have been utilized with little or no attention given to the possible uses of wind energy.

However, in recent times, primarily due to the ever-increasing public awareness of energy shortages, the possible use of wind energy has been given additional attention.

There are two basic types of wind turbines or windmills, the two terms being utilized herein interchangeably. One of these is the vertical axis windmill or turbine which will accept wind from any direction with the power being typically available at the ground level. The other is a horizontal axis machine perhaps best typified by the familiar "old Dutch windmill." This invention relates to an improvement in the vertical axis windmill.

Most problems with vertical axis type wind turbines have been with the wind rotor for the wind turbine which travels at very high rates of speed during times of strong wind. Thus, for example, a high speed wind rotor with straight, rigid blades parallel to the axis of rotation is subjected to very high bending moments due to centrifugal forces and often necessitates extensive bracing to withstand the high forces. On the other hand, perfectly flexible blades on a high speed vertical axis rotor are undesirable in that their wind catching ability is greatly reduced and correspondingly their efficiency in conversion of wind energy into other forms of energy is greatly inhibited. Thus one problem which has existed in the prior art is that wind rotors having blades of the most efficient wind catching structure cause the most stress forces on the frame for the wind rotor and in extreme situations may cause damage thereto. On the other hand, blade configurations which cause the least stress to the turbine structure in turn are the least efficient in wind energy gathering ability and transfer of that wind energy in an efficient manner to other useful energy sources.

Accordingly, one object of this invention is to provide an improved wind rotor for a vertical axis wind turbine which makes very efficient use of the available wind energy.

Another object of this invention is to provide a wind rotor for a vertical axis wind turbine which in spite of its highly efficient performance, will not operate during strong winds at such high speeds as to create centrifugal forces having the potential for damaging the overall structure of the wind turbine.

Yet another object of this invention is to provide a wind rotor for a vertical axis wind turbine with the rotor having concave surfaced wind catching members and convex surfaced wind deflecting members in order to provide for extremely efficient wind energy transfer on the one hand and correspondingly extremely efficient air flow with little resistance past the wind deflecting convex surfaces.

Still another object of this invention is to provide a wind rotor with the rotor having wind break gaps therein in order to prevent excess damage to the wind turbine during periods of excessively high winds.

Yet another object of this invention is to provide all of the above objects in a structure which is simple to make, and can efficiently and economically be manufactured and sold.

The method of accomplishing these and other objects of the invention will be apparent from the following description of the invention.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view showing a vertical axis wind turbine with the wind rotor of this invention positioned thereon.

FIG. 2 is a top plan view of the wind rotor of this invention taken along line 2—2 of FIG. 1.

FIG. 3 is an elevated sectional view of the wind rotor of this invention taken along line 3—3 of FIG. 2.

FIG. 4 is a sectional view of one of the wind catching members of the wind rotor taken along line 4—4 of FIG. 2.

DETAILED DESCRIPTION OF THE INVENTION

The vertical axis wind turbine, 10, as shown in FIG. 1. is comprised of a stationary frame member, a rotatable shaft, and a wind rotor. The stationary frame is comprised of legs 12, 14, 16 and 18 which extend upwardly and inwardly from the ground to a top base member 20 to form a frame of a pyramid like configuration. As depicted in the drawing, support bars 22 may extend between the leg members for additional strength. As further depicted in the drawing, the legs are securely attached to the ground on mounting pads 24. Of course, it is to be realized that many other types of configurations of stationary frames may be utilized, the precise structure of the stationary frame not being a part of the invention described herein.

A rotatable shaft 26 is journaled in a conventional fashion in the stationary frame member and extends from the wind rotor, generally depicted as 28, to a power transfer means 30. Power transfer means 30 is depicted as sitting on platform 32 which is shown as built within the stationary frame and joined to each of legs 12, 14, 16 and 18. As will be appreciated by those skilled in the art, power transfer means depicted herein at 30, can comprise for example a generator to transfer the rotatable energy imparted to the rotatable shaft to electrical energy, a transmission means in order to convert the rotor energy to other forms of mechanical energy, or the like. As depicted herein power transfer means 30 is a generator and electrical current is generated there within and transferred to the electrical lines schematically depicted at 32.

Wind rotor 28 is attached to or circumposed on the rotatable shaft 26 at the top end of rotary shaft 26. As depicted wind rotor 28 is rigidly secured to rotary shaft 26 by conventional means which will therefore not be described in detail herein.

Wind rotor 28 has oppositely disposed arms 34 and 36 and 38 and 40 radiating outwardly from rotary shaft 26. Preferably arms 34, 36, 38 and 40 are of equal length. Of course, the number of oppositely disposed arms may vary and the precise number to be utilized is well within the skill of one in the art.

Mounted at the end of arm 34 are wind catching concave surfaced members 42. Members 42 are semi-cylindrical in shape having top wall 44, bottom wall 46, and semi-circular shaped wall 48, extending therebetween. Wind catchers 42 are mounted to arm 34 by bolts 54 which extend through arm 34 and through wind catchers 42 and are rigidly secured to arm 343 by nuts threadably received on the bolts in conventional fashion. Of course, other means of fastening wind catchers 42 to arm 34 can be utilized. As depicted herein and as preferred, arm 34 is in fact comprised of two parallel support members 34a and 34b, but for purposes of description and clarity, it is to be understood that both support members 34a and 34b in fact comprise as a unit one arm of the wind rotor 28.

As can be seen, concave surface 48 provides a surface which will conveniently catch the wind and impart rotary motion to the wind rotor. Preferably two wind catching members each having a concave surface 48 are provided in spaced apart relationship as depicted with greatest particularity in FIG. 3. The spaced apart relationship is preferred in order to provide a wind break gap 50. Gap 50 provides for passage of some wind therethrough and prevents the wind rotor, and the stationary frame for the wind rotor, from being damaged by the unusually high forces caused by the centrifugal force generated by the rapid rotary motion of the wind rotor during excessively high winds.

Oppositely disposed to arm 34 is arm 36 which has wind deflecting members 52. Wind deflecting members 52 are of like configuration and are mounted in like fashion to wind catching members 42. As can be seen in FIG. 2, wind deflecting members 52 are mounted on arm 36 to provide a convex surface positioned opposite concave wind catching surfaces 48. Thus whenever wind catching concave surfaces 48 on arm 34 are functioning to catch wind and impart rotary motion to the wind rotor, oppositely disposed convex surfaces at the end of arm 36 will correspondingly be deflecting wind therefrom without imparting any resistance to the rotary motion imparted by the wind blowing against concave surfaces 48. As can be seen, the wind deflecting member is comprised of a semicircular configuration having a convex surface, not numbered, and top and bottom members of like configuration to those previously described. It is mounted in conventional fashion as previously described with regard to wind catching members 42.

As depicted in the drawings, support bars 56 and 58 extend between the parallel braces 34a and 34b forming arm 34. These provide increased strength for the wind rotor 28.

In operation, the wind rotor works as follows: Wind flowing against the concave surfaces 48 will impart rotary motion in the direction of arrow 60. Because wind deflecting members 52, or more accurately, the concave surfaces thereof are positioned at the end of arm 36 opposite arm 34 and correspondingly opposite concave surfaces 42, the convex surfaces of member 52 will provide for efficient aerodynamic passage of air thereby without hindering the rotary motion already imparted to wind catching surfaces 48. If the wind is at excessively high speeds, wind break gap 50 will allow some of the air to pass by surfaces 48 in order to prevent extreme speeds of the wind rotor. This will assure no damage to the structure of the wind rotor or the stationary frame member. Preferably for purposes of greatest efficiency, the wind break gap 50 has a ratio of width to the wind catching members 42 of 1 to 2.

Preferably the wind catching and wind deflecting members are comprised of light weight but durable materials. Examples include plastic, styrofoams and the like. This assures that less centrifugal force and corresponding strain will be provided on the wind generator.

Thus as can be seen, an efficient wind rotor accomplishing all of the objects of the invention has been provided.

What is claimed is:

1. A vertical axis wind turbine comprising in combination, a stationary frame member, a rotatable shaft vertically journaled in said stationary frame member, circumposed on said rotatable shaft a wind rotor comprised of a rotatable frame, the longitudinal axis of said rotatable frame being generally transverse to the longitudinal axis of said rotatable shaft, so that said rotatable frame may rotate about the longitudinal axis of said rotatable shaft, said rotatable frame having at least two arms oppositely disposed with respect to each other radiating outwardly from said rotatable shaft, one of said arms having mounted thereon at least two concave surfaced semi-cylindrical shaped wind catching members, said wind catching members being spaced apart to define a wind break gap therebetween, and the other of said arms having mounted thereon at least two convex surfaced semi-cylindrical shaped wind deflecting members, said wind deflecting members being spaced apart to define a wind break gap therebetween, said wind break gaps, cooperatively acting with said semi-cylindrical shaped wind catching members and said semicylindrical shaped deflecting members during periods of strong wind to prevent destruction of said wind turbine caused by the stresses of excessively high rotational speeds induced by strong winds.

2. The wind turbine of claim 1 wherein said wind catching members and said wind deflecting members are mounted adjacent the ends of their respective arms.

3. The wind turbine of claim 1 wherein the ratio of the width of the gap to the width of the members defining the gap is about 1:2.

* * * * *